US012794782B2

(12) United States Patent
Henry et al.

(10) Patent No.: US 12,794,782 B2
(45) Date of Patent: Nov. 10, 2026

(54) GENERATING FLOORPLANS VIA MACHINE LEARNING IN NETWORK DEVICES

(71) Applicant: Cisco Technology, Inc., San Jose, CA (US)

(72) Inventors: Jerome Henry, Pittsboro, NC (US); Pascal Thubert, Roquefort les Pins (FR); JP Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/451,662

(22) Filed: Aug. 17, 2023

(65) Prior Publication Data

US 2024/0380672 A1 Nov. 14, 2024

Related U.S. Application Data

(60) Provisional application No. 63/501,447, filed on May 11, 2023.

(51) Int. Cl.
*H04L 41/14* (2022.01)
*H04L 41/16* (2022.01)
(Continued)

(52) U.S. Cl.
CPC ............ *H04L 41/145* (2013.01); *H04L 41/16* (2013.01); *H04L 43/00* (2013.01); *H04L 43/08* (2013.01);
(Continued)

(58) Field of Classification Search
CPC ......... H04L 43/00; H04L 43/08; H04L 43/50; H04L 41/145; H04L 41/16; H04L 2012/5652
See application file for complete search history.

(56) References Cited

U.S. PATENT DOCUMENTS 9,854,607 B1 * 12/2017 Chu .................... H04W 74/002
10,235,823 B1 * 3/2019 Saleh ..................... H04B 17/27
(Continued)

FOREIGN PATENT DOCUMENTS

WO WO-2006105707 A1 * 10/2006 ............. H04L 43/50
WO WO-2016150512 A1 * 9/2016 ........... H04L 1/0027
(Continued)

OTHER PUBLICATIONS

Elbes, M., et al. "A Platform for Power Management Based on Indoor Localization in Smart Buildings Using Long Short-Term Neural Networks," Trans Emerging Tel Tech. 2020;e3867. https://doi.org/10.1002/ett.3867.

*Primary Examiner* — Lance Leonard Barry
(74) *Attorney, Agent, or Firm* — Rutan & Tucker, LLP; Ravi Mohan; Marc A. McClain

(57) ABSTRACT

Devices, systems, methods, and processes for network device power management at the floor level are described herein. Network devices can communicate with various devices in a wireless network. However, environmental changes, barriers, and other hazards exist in each deployment environment. To better understand each deployment environment, a floorplan can be generated by sending out a plurality of test frames. These test frames can be formatted with power data that is associated with the transmission power level that each test frame is transmitted at. The receiving network device can compare this power data with an actual measurement of the received signals. This data can all be packaged into a client report that can be sent back to the transmitting device which can then process this client report from multiple network devices such that a floorplan can be generated which can be utilized to make more efficient network decisions in the future.

14 Claims, 9 Drawing Sheets

(51) Int. Cl.
*H04L 43/00* (2022.01)
*H04L 43/08* (2022.01)
*H04L 43/50* (2022.01)
*H04L 12/70* (2013.01)

(52) U.S. Cl.
CPC ...... *H04L 43/50* (2013.01); *H04L 2012/5652* (2013.01)

(56) References Cited

U.S. PATENT DOCUMENTS

| | | | | |
|---|---|---|---|---|
| 10,666,542 | B1 * | 5/2020 | Olgaard | H04L 43/50 |
| 2006/0035660 | A1 * | 2/2006 | Anderson | H04W 72/23 455/69 |
| 2007/0233847 | A1 * | 10/2007 | Aldereguia | H04L 43/50 709/224 |
| 2008/0117825 | A1 * | 5/2008 | Krzanowski | H04L 43/50 370/241 |
| 2008/0310490 | A1 * | 12/2008 | Jitsuno | G01R 31/2841 702/124 |
| 2009/0257357 | A1 * | 10/2009 | Marsh | H04L 1/0009 370/252 |
| 2010/0246419 | A1 | 9/2010 | Batta et al. | |
| 2010/0317394 | A1 * | 12/2010 | Harris | H04W 52/367 455/522 |
| 2012/0087315 | A1 * | 4/2012 | Sivaprakasam | H04W 8/26 370/329 |
| 2012/0295654 | A1 | 11/2012 | Sridhara et al. | |
| 2013/0004179 | A1 * | 1/2013 | Nielsen | H04B 3/02 398/115 |
| 2014/0015334 | A1 * | 1/2014 | Jung | H02J 7/00034 307/104 |
| 2018/0103408 | A1 * | 4/2018 | Amini | H04W 36/20 |
| 2019/0101632 | A1 | 4/2019 | Ebido et al. | |
| 2020/0076552 | A1 * | 3/2020 | Cherian | H04L 5/0035 |
| 2020/0322916 | A1 * | 10/2020 | Ta | H04W 4/029 |
| 2020/0336868 | A1 * | 10/2020 | Gunasekara | H04B 17/29 |
| 2023/0050564 | A1 * | 2/2023 | Saloni | H04W 24/04 |
| 2023/0079658 | A1 | 3/2023 | Park et al. | |

FOREIGN PATENT DOCUMENTS

| | | | | | |
|---|---|---|---|---|---|
| WO | WO-2017118197 | A1 * | 7/2017 | | H04W 74/002 |
| WO | WO-2019153756 | A1 * | 8/2019 | | H04W 28/16 |
| WO | WO-2020205545 | A1 * | 10/2020 | | G06F 16/735 |

* cited by examiner

GENERATING FLOORPLANS VIA MACHINE LEARNING IN NETWORK DEVICES

PRIORITY

This application claims the benefit of and priority to U.S. Provisional Application No. 63/501,447, filed May 11, 2023, which is incorporated in its entirety herein.

The present disclosure relates to networking. More particularly, the present disclosure relates to generating floorplans via one or more machine learning processes by transmitting and measuring test frames at unique transmission power levels throughout a network.

BACKGROUND

Effective floor coverage management is a critical but challenging aspect of Access Point (AP) deployment. Striking an appropriate balance between AP power levels is crucial to ensure optimal client experiences. When AP power is set too high, for example, it often leads to the occurrence of Overlapping Basic Service Sets (OBSS), causing interference and deteriorating the client's connectivity and overall experience. On the other hand, if AP power is set too low, coverage gaps emerge, which could leave certain areas underserved, leading to subpar user experiences. Addressing these issues requires a meticulous approach that accounts factors such as building layout, client density, and interference sources to achieve seamless coverage while avoiding any detrimental impacts on network performance and user satisfaction.

Traditionally, addressing the issue of Wi-Fi floor coverage has relied on infrastructure-based solutions, such as Radio Resource Management (RRM), or basic exchange mechanisms with individual Station (STA) devices, like utilizing 802.11k beacon reports to estimate the STA's position. However, with the advent of Wi-Fi 8, an opportunity arises to develop a more sophisticated method at the floor level. As the industry acknowledges the prevalence of floor-wide deployments, efficient coverage coordination becomes imperative for Multi-AP Power Control (MAPC). This situation calls for optimized coverage with AP-to-AP messages and active client cooperation, aligning with the objectives of the UHR/802.11 bn group.

Nevertheless, the task of coordinating AP power at the floor level poses a challenge as it is categorized as an NP-hard problem. Yet, Artificial Intelligence and Machine Learning (AIML) techniques show promise in tackling such complexities. These methods, however, necessitate the establishment of standardized and defined frames for communication between APs and between APs and clients.

SUMMARY OF THE DISCLOSURE

Systems and methods for incorporating sustainability data within a header of a data packet to allow for the generation of sustainable configurations for various network devices in accordance with embodiments of the disclosure are described herein. In some embodiments, a device includes a processor, at least one network interface controller configured to provide access to a network, and a memory communicatively coupled to the processor wherein the memory includes a floor plan mapping logic. The logic is configured to generate a plurality of test frames for transmission to network devices on the network, transmit the generated plurality of test frames, receive client report data from at least one network device on the network, and generate a floor plan mapping based on the received client report data.

In some embodiments, the client report data includes a plurality of power data and power measurement data.

In some embodiments, the floor plan mapping is generated via one or more machine learning models.

In some embodiments, the one or more machine learning models utilize the client report data as input data and generates floor plan mapping data as an output.

In some embodiments, the floor plan mapping logic is configured to first transmits a power measurement request to a plurality of network devices prior to the generation of the plurality of test frames.

In some embodiments, the plurality of test frames is transmitted at unique transmission power levels.

In some embodiments, each of the plurality of test frames has power data associated with the unique transmission power level.

In some embodiments, the power data is incorporated within a header of the test frame.

In some embodiments, a power measurement request is incorporated within the test frame.

In some embodiments, a payload of the test frame is configured to be empty.

In some embodiments, a payload of the test frame is configured with padding data.

In some embodiments, a device includes a processor, at least one network interface controller configured to provide access to a network, and a memory communicatively coupled to the processor, wherein the memory includes a floor plan mapping logic. The logic is configured to receive a power measurement request from a network device on the network, transmit an acknowledgment signal to the network device, receive a plurality of test frames configured to include at least power data, process the power data, generate a client report based on at least the processed power data, and transmit the generated client report to the network device.

In some embodiments, the received plurality of test frames are configured at unique transmission power levels such that each test frame is received at a unique signal strength.

In some embodiments, processing the power data includes measuring the unique signal strength of each of the plurality of test frames.

In some embodiments, the power data includes the transmission power level of the test frame signals when transmitted from the network device.

In some embodiments, the power data further includes a comparison value between the measurement of the unique signal strength to the transmission power level of the test frame signal.

In some embodiments, a method of generating a floor plan mapping includes generating a first plurality of test frames for transmission to network devices on a network, transmitting the generated first plurality of test frames, receiving client report data from at least one network device on the network, and generating a floorplan mapping based on the received client report data.

In some embodiments, the method further includes generating a floor plan based on at least the received client report.

In some embodiments, the method further includes verifying the floorplan.

In some embodiments, upon verification of the floorplan, a second plurality of test frames are transmitted to the plurality of devices, wherein the second plurality of test frames includes fewer test frames than the first plurality of test frames.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
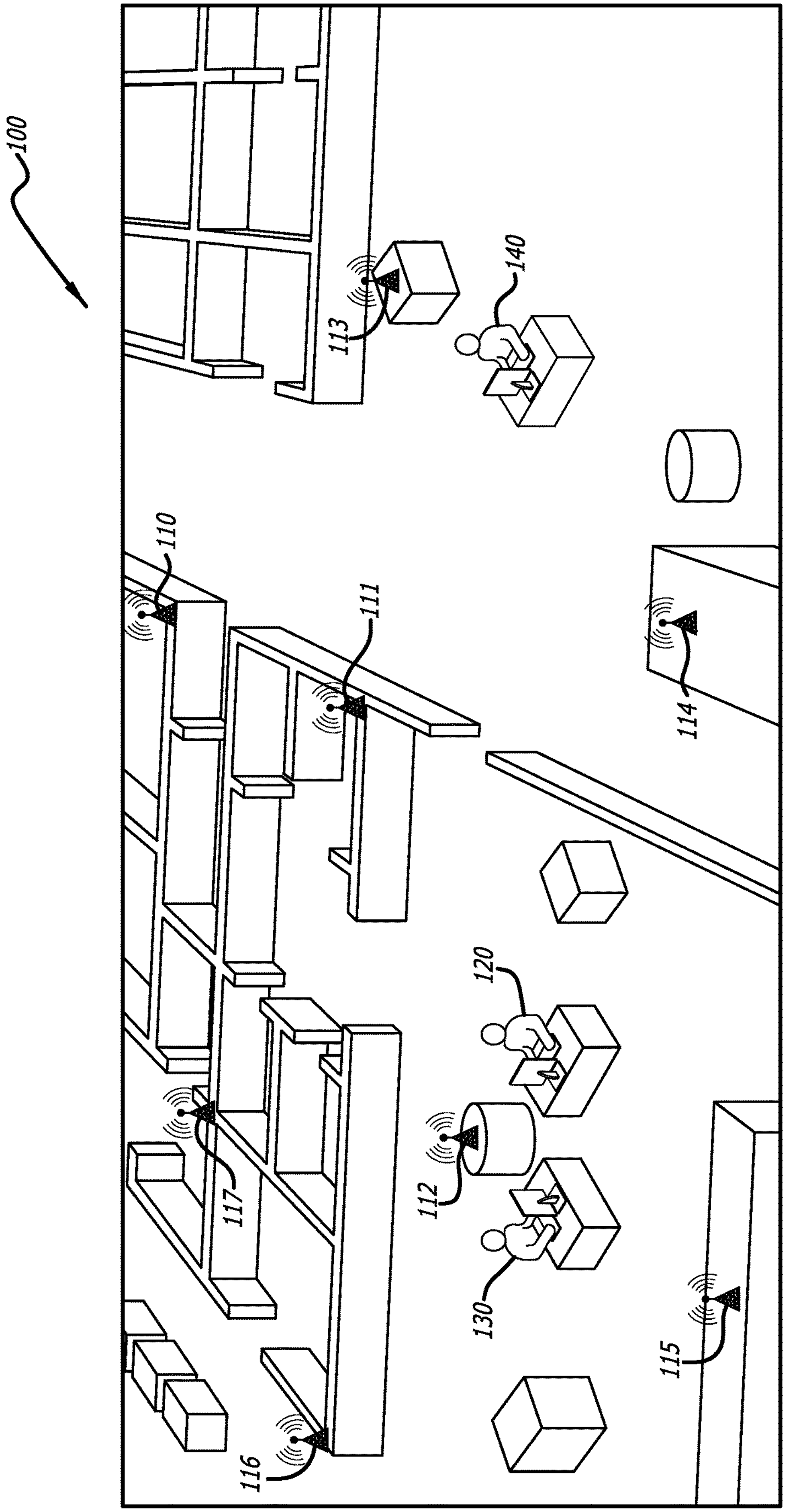
FIG. 1 is a conceptual illustration of a floorplan with a plurality of network devices deployed within in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that utilize AP power management at the floor level in a collaborative manner such that both Access Points (APs) and Station (STA) devices actively contribute to the network's optimization. In many embodiments, by actively participating in the power management process, STAs may be configured to play a pivotal role in shaping the network's performance. In return, they reap the rewards of an enhanced coverage map, which translates into improved connectivity and a superior user experience throughout the floor.

To facilitate this cooperative endeavor, it is envisioned that the existing Wi-Fi Standard may be expanded and augmented. This enhancement enables seamless communication between APs and STAs, fostering the exchange of floor coverage observations and conclusions. By facilitating this dynamic dialogue, the wireless network gains valuable insights into the real-time performance of APs and the signal reception at different locations on the floor. This enables the network to adapt and optimize AP power levels based on comprehensive data, resulting in more efficient coverage and reduced interference.

The emergence of Wi-Fi 8 introduces new possibilities for enhancing wireless network performance, particularly in scenarios where coverage spans entire floors. Recognizing the practicality and demand for comprehensive floor-level deployments, the need for effective coverage coordination in MAPC becomes evident within the UHR/802.11bn group, for example. With this context, optimizing coverage in many embodiments includes employing AP-to-AP messages and engaging client cooperation to ensure seamless connectivity.

However, the complexity of coordinating AP power at the floor level brings about NP-hard computational challenges. Despite this, the integration of AI/ML techniques as described herein provides a promising avenue for solving such intricate problems. These techniques offer, for example, the potential for advanced coverage management and performance optimization. Nevertheless, for AI/ML to be effectively deployed, standardizing, and defining the communication frames between APs and between APs and clients is imperative, so as to establish a unified and interoperable approach to address floor-wide coverage issues.

In many embodiments, with the collaborative efforts of both APs and STAs, the network becomes self-aware, capable of recognizing coverage gaps and addressing them promptly. For example, the STAs' contributions empower the network to make informed decisions about AP power adjustments, ensuring that each client enjoys a stable and reliable connection while minimizing the risk of congested or overlapping coverage areas.

In many embodiments, a unique approach to AP power management specifically designed for floor-level deployments is described. Those skilled in the art will appreciate the cooperative nature of embodiments as described herein, wherein both the APs and STA devices actively contribute to the optimization process. In various embodiments the cooperative approach leverages the active participation of STAs, transforming them from passive clients to valuable contributors in the network's functioning. By encouraging STAs to share crucial information about their connectivity and signal strength observations, the overall coverage map at the floor level can be significantly improved.

By providing their feedback and collaborating with the APs, the STAs can navigate through a network with a better and more refined coverage map, resulting in enhanced connectivity and overall user experience. As a result, the STAs experience reduced instances of signal drop-offs, dead zones, and subpar connections. This cooperation fosters a dynamic and self-optimizing wireless environment, where both the network infrastructure and the clients work in tandem to continually fine-tune the AP power levels based on real-time data.

In some embodiments, a new frame is introduced, which serves as a potential complement to the existing 802.11k standard. It is envisioned that the new frame may comprise a power measurement request that enables an AP to actively request power measurements from either another AP or a specific STA within the network. The fundamental purpose of this request is to indicate the AP's intention to conduct a series of test messages, which may provide valuable insights into the wireless environment's characteristics.

It is envisioned that when an AP initiates a power measurement request, it may include any number of parameters in the frame. These parameters may encompass details regarding the forthcoming test messages, such as the message count and the total duration over which the test will be conducted. Armed with this information, the addressed AP or STA can prepare to respond and participate in the cooperative measurement process. This real-time exchange of power measurement data empowers the requesting AP to gain a comprehensive understanding of the neighboring AP's or STA's signal strength and connectivity quality, for example.

It should be appreciated that by incorporating this new frame into the network's operation, AP power management can be significantly enhanced. The active engagement of neighboring APs and STAs in the measurement process allows for a more holistic assessment of the wireless environment's performance. This data-driven approach facilitates intelligent and adaptive AP power adjustments, leading to improved coverage optimization and reduced interference levels. Consequently, the cooperative nature of this frame empowers both APs and STAs to work together harmoniously, fostering an environment of collaboration and mutual benefit. Moreover, the standardized implementation of this frame ensures interoperability and seamless integration across different Wi-Fi infrastructures, making it a beneficial and complementary addition to wireless standards, including by way of non-limiting example, the 802.11k standard.

In some embodiments, upon successful acceptance of the power measurement request by either the targeted STA or the other AP, the requesting AP may initiate a power measurement request by sending a series of test frames. These frames may be configured as type management frames, for example, and may contain crucial information encoded in their headers, thereby facilitating a comprehensive evaluation of the AP's power and its impact on the wireless environment. The initial frame in the series may include a current AP power level, providing a reference point for subsequent measurements. Similarly, a frame index may be included to signify a position of the frame within the series of tests, such as one of four, ensuring order and coherence in the measurement process. It should be appreciated that the number and series of tests may be varied without limitation and are only provided by way of non-limiting example.

Additionally, in many embodiments the payload of the first test frame may be purposely kept empty or padded with a short and insignificant data segment. The purpose of this configuration is to allow the targeted STA to exclusively assess the received signal strength indicator (RSSI) of the AP without being influenced by any extraneous data in the payload. This enables the STA to accurately gauge the signal strength of the AP at its current power level.

Following the transmission of the first test frame, the requesting AP proceeds to transmit subsequent frames at different power levels. Each frame in the series is transmitted with a distinct power level configuration, ranging from lower to higher values, systematically exploring the possible power settings of the AP. The purpose of this sequential variation in power levels is to gather comprehensive data on the impact of different AP power settings on signal reception and network performance.

In some embodiments, the cooperative measurement process continues until the entire series of frames is completed, encompassing a range of power levels and their respective RSSI readings. By employing this systematic approach, both the requesting AP and the participating STA gain valuable insights into the ideal power level for optimal network performance. This iterative process of transmitting test frames with varying power levels forms the cornerstone of the cooperative method for AP power management at the floor level, offering a data-driven and empirical foundation for making informed decisions regarding AP power adjustments.

It should be understood that as the series of test frames concludes, the gathered data provides a wealth of information for the requesting AP to analyze and adapt its power settings. Leveraging the measurements obtained from the STA's responses, the AP can intelligently optimize its power level, ensuring enhanced coverage, reduced interference, and ultimately delivering a superior wireless experience for all connected clients. This collaborative and iterative process exemplifies the power of cooperative networking in enabling efficient and dynamic AP power management at the floor level.

In some embodiments, upon receiving the series of test frames from the requesting AP, the Station (STA) diligently awaits the completion of the specified duration timer before generating a comprehensive report. This report serves as a vital feedback mechanism, providing valuable insights into the received signal strength indicator (RSSI) for each of the frames within the sequence. The STA meticulously records the RSSI values at which it received each frame, effectively capturing the impact of different AP power levels on signal reception.

It is envisioned that during the measurement process, it is plausible that certain frames were not received by the STA due to the AP power being set too low. These missing messages are noted in the report, signifying the boundary beyond which the AP's signal strength becomes insufficient for reliable communication. This information is crucial in identifying the limitations of AP coverage and ensuring that any potential coverage gaps are duly addressed. In some embodiments, reports may be enriched and generated with RSSI measurements and details of missing frames. In various embodiments, the generated reports may be relayed to an AI/ML logic or machine-learning model to process the accumulated data from multiple STAs and APs, so as to make informed decisions and derive meaningful insights. In some embodiments, the machine-learning model can perform intricate analyses, allowing it to determine the precise perimeter and range of each AP's signal coverage. By discerning which APs can "hear" each other and at what power levels, the engine constructs a comprehensive network topology. This information is invaluable in optimizing AP power management and mitigating interference issues.

In many embodiments the machine-learning model may use the collective data from the STA reports to dynamically adjust AP power levels, optimizing coverage and minimizing overlaps between neighboring APs. The fine-grained information on AP perimeters and signal ranges enables the engine to orchestrate intelligent power control, ensuring seamless handoffs for clients as they move within the coverage area.

Ultimately, this cooperative and data-driven approach to AP power management significantly enhances the overall network performance. It allows for an adaptive and self-optimizing wireless environment where APs intelligently fine-tune their power levels based on real-time feedback from connected STAs. By harnessing the power of the machine-learning model and leveraging the cooperation between APs and STAs, more efficient and reliable Wi-Fi networks may be realized, and user experiences may be improved with respect to all connected devices.

In some embodiments, the machine-learning model harnesses the gathered data to construct a detailed model of the entire floor. The engine employs a sophisticated algorithm, such as genetic algorithms or other efficient methods, to ensure that each AP can detect at least "n" (a user-configurable parameter) other APs within its vicinity. The primary objective is to achieve complete floor coverage without any gaps, ensuring seamless connectivity for all clients throughout the area.

For example, the machine-learning model may orchestrate a series of AP-to-AP messaging, during which the APs exchange information about the neighboring APs they can detect. Through iterative processes, the machine-learning model may determine the optimal power levels for each AP, allowing them to maintain communication with a sufficient number of neighboring APs while avoiding unnecessary interference. This dynamic power control ensures an efficient and balanced distribution of APs' coverage areas across the floor.

In some embodiments, with the AP-to-AP messaging phase concluded, the machine-learning model may perform a series of random client queries at randomized intervals. It instructs the APs to request selected clients to measure the signal strength of one (randomly chosen) AP among the nearby APs. The training process then involves analyzing the responses received from clients to predict the likelihood of a client, detected by "m" neighboring APs, also being within range of the target "n" APs. As the training continues, the engine refines the model, seeking to optimize its accuracy in predicting client coverage. Whenever a prediction fails and a client cannot detect the target AP at a given power level based on the current version of the model, the engine iteratively removes the corresponding version of the model (akin to removing a gene in genetic algorithm terminology). This process of natural selection ensures that only the most effective combinations of AP power levels are retained, leading to improved coverage and network performance.

The iterative training process advances until the machine-learning model achieves a mature model, one that fulfills the dual criteria of complete floor coverage and proximity of each tested client to the target "n" APs. Through this advanced and dynamic optimization technique, the engine successfully fine-tunes the AP power levels to strike an optimal balance between coverage and interference, maximizing the efficiency and reliability of the Wi-Fi network.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code.

Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a floorplan with a plurality of network devices deployed within in accordance with various embodiments of the disclosure is shown. In some embodiments, a virtual floorplan 100 can effectively represent any networking environment, providing a visual blueprint of the spatial layout and deployment of various network devices. It should be understood that although the virtual floorplan 100 is shown as an office configuration with various cubicles, for example, classrooms, retail stores, warehouses, or any other settings may be visually represented to suit the unique requirements of each space. Furthermore, the options for configuring such virtual representations are diverse, ranging from traditional 2D floorplans to more advanced 3D models. In a 2D format, various devices such as APs, routers, etc. may be symbolically represented, along with various users and connections. Similarly, 3D floorplans may be utilized, thereby enabling a realistic visualization of the network infrastructure, signal propagation, and user interactions within the environment. Moreover, other styles, such as heatmaps, can display signal strength variations across the space, aiding in network optimization and troubleshooting. Whether for planning, analysis, or monitoring, a virtual floorplan empowers network administrators to efficiently manage and enhance connectivity in a wide range of environments. As shown, the virtual floorplan 100 is configured to showcase the deployment of a wireless network with multiple APs, denoted by elements 110, 111, 112, 113, 114, 115, 116, and 117. Of course, the exact number of APs may be varied without limitation, as APs may be deployed to provide comprehensive coverage and support varying user densities, ensuring a reliable and efficient wireless network for all users.

Furthermore, those skilled in the art will appreciate that APs may be strategically placed anywhere in a floorplan to ensure optimal wireless coverage and connectivity. For example, the APs (110-117) may be mounted on walls, ceilings, or discreetly integrated into the environment. AP placement may include consideration of factors such as signal strength, interference, and the number of concurrent users, making it possible to create a robust and seamless wireless network in any networking environment.

In some embodiments, for example, AP 110 may be located in a northern position of the office, thereby providing strong coverage to adjacent workstations and cubicles. Similarly, AP 111 may be at the center of the office to ensure broad coverage throughout the workspace. To that end, AP 112 may be placed strategically near the user desks to facilitate seamless connectivity for visitors and guests, for example. Similarly, APs 113-117 may be mounted or otherwise disposed in any collaboration zone, breakroom area, remote desks, corridors, or corners of the environment, without limitation. Users in the virtual floorplan 100 (e.g., user 120, 130, and 140) may be represented by an icon, various colors, or using any other representation without limitation.

In some embodiments, the virtual floorplan 100 may incorporate colored lines to represent the signal strength of the different APs. Green lines may indicate strong signal coverage, yellow lines may denote medium coverage, and red lines may depict areas with weaker coverage. The colors and precise representations may be varied without exceeding beyond the spirit and scope of the instant disclosure. It should be understood that the virtual floorplan 100 described is merely an illustrative representation. Thus, the number and positioning of network devices may vary based on the environment's actual layout, size, and specific requirements.

Although a specific embodiment for conceptual illustration of a floorplan with a plurality of network devices deployed suitable for carrying out the various steps, processes, methods, and operations described herein is discussed with respect to FIG. 1, any of a variety of systems and/or processes may be utilized in accordance with embodiments of the disclosure. For example, the device, controller, or logic may be a specialized device within the network or operated by a network administrator remotely from the deployed environment. In certain embodiments, the device, controller, or logic may be a logic that is operated or distributed through the APs of the network. The elements depicted in FIG. 1 may also be interchangeable with other elements of FIGS. 2-9 as required to realize a particularly desired embodiment.

Figure 2:
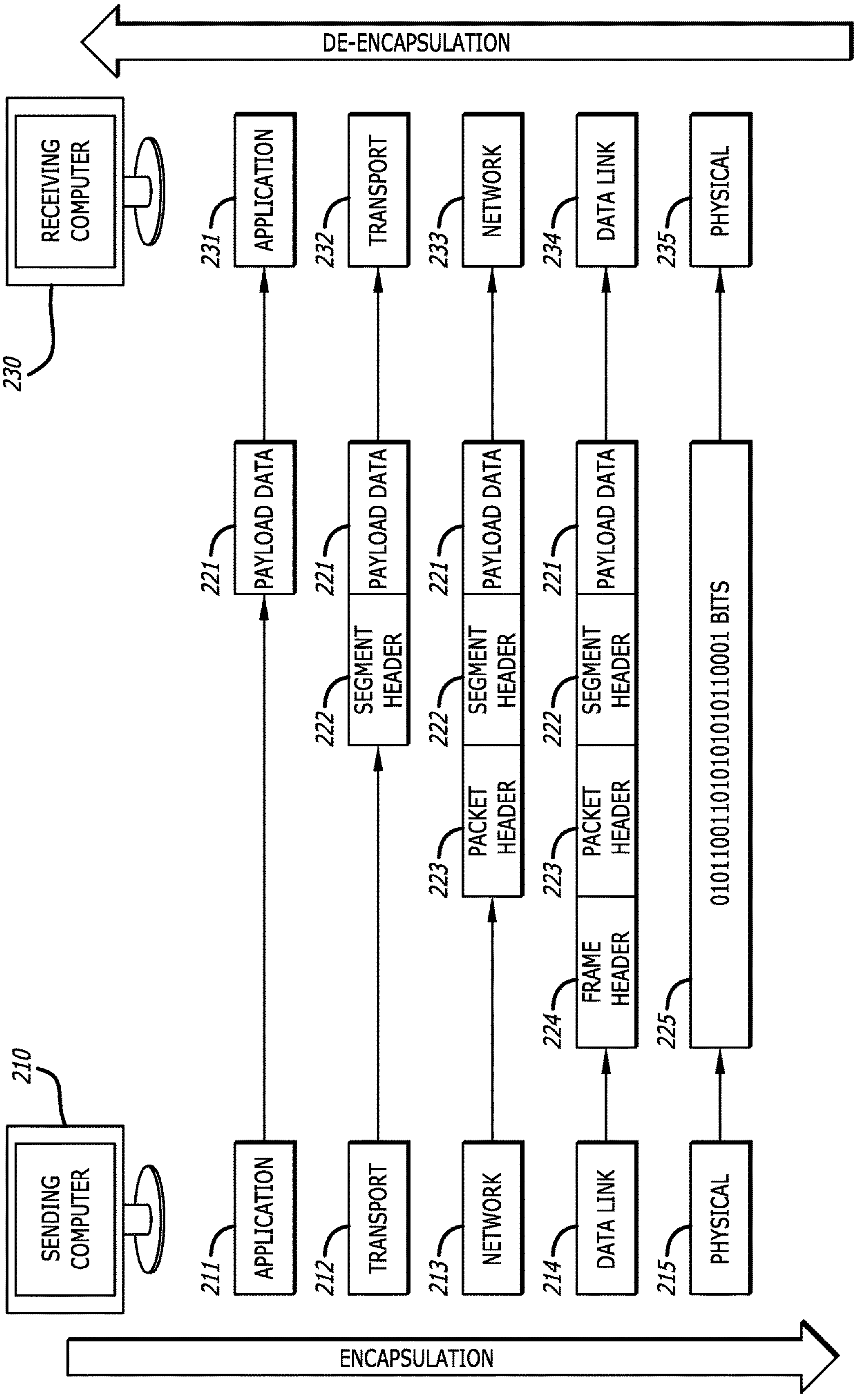
FIG. 2 is a conceptual illustration of a payload data being encapsulated by a network device, transmitted, and decapsulated by a client device in accordance with various embodiments of the disclosure.

Referring to FIG. 2, a conceptual illustration of a payload data being encapsulated by a network device, transmitted, and decapsulated by a client device in accordance with various embodiments of the disclosure is shown. In some embodiments, a payload data 221 may be encapsulated by a network device for its subsequent transmission from a sending computer 210 to a receiving computer 230. At the sending computer's application layer 211, the payload data 221 is prepared for transmission and corresponds to the receiving computer's application layer 231 during the decapsulation process. Payload data 221 may include actual data generated by the application at the sending computer 210 that needs to be transmitted to the receiving computer 230. It may include any of various files, text, images, or any other information exchanged between the two devices.

In many embodiments, the application layer (e.g., layer 7 in the OSI model) is responsible for handling the communication between software applications running on different devices. It prepares the payload data 221 generated by the application running on the sending computer 210 for transmission, ensuring that the data is in a format that the receiving computer's application layer 231 can understand during the decapsulation process. Moving to the transport layer 212, a segment header 222 is added to the payload data 221. This segment header 222 corresponds to the transport layer 232 of the receiving computer 230 during the decapsulation process.

The segment header 222 may include a section of data that is added to the payload at the transport layer. It contains control information needed for segmenting the data and ensuring reliable transmission. The transport layer (e.g., layer 4 in the OSI model) manages end-to-end communication and ensures data integrity and reliability. In this context, a segment header (222) is added to the payload data (221) at the transport layer (212). The segment header contains control information needed to properly reassemble the data at the receiving computer's transport layer (232) during decapsulation.

In many embodiments, a packet header 223 is appended to the combination of segment header 222 and payload data at the network layer 213. This packet header 223 may correspond to the network layer 233 of the receiving computer 230 during the decapsulation process. In general, the packet header 223 includes a section of data added to the combination of the segment header and payload data at the network layer. It contains routing information for proper delivery of the packet to the destination. The network layer (e.g., layer 3 in the OSI model) handles routing and forwarding of data packets between devices on different networks. For example, a packet header 223 is appended to the combination of the segment header 222 and payload data 221 at the network layer 213. In general, the packet header contains information necessary for proper routing and delivery of the packet to the destination network during decapsulation at the receiving computer's network layer 233.

Proceeding to the data link layer 214, a frame header 224 is added to the packet header 223 and payload data 221. This frame header 224 corresponds to the data link layer 234 of the receiving computer 230 during the decapsulation process. The frame header 224 is a section of data added to the packet header and payload data at the data link layer. It includes addressing, synchronization, and error-checking information for reliable data transfer within the local network segment. The data link layer (e.g., layer 2 in the OSI model) is responsible for reliable data transfer within a local network segment. In many embodiments, a frame header 224 is added to the packet header 223 and payload data 221 at this layer 214. In general, the frame header may include synchronization, addressing, and error-checking information to facilitate proper data transfer during the decapsulation process at the receiving computer's data link layer 234. Finally, at the physical layer 215, the packet 225 may be represented as a series of 0's and 1's for transmission over the physical medium. In many embodiments, the packet 225 may correspond to the physical layer 235 of the receiving computer 230 during the decapsulation process. The physical layer (e.g., layer 1 in the OSI model) corresponds to the actual transmission of bits over a physical medium (e.g., cables or wireless signals). Consequently, the packet 225 containing the encapsulated data is represented as a series of 0's and 1's for transmission over the physical medium. Thus, in many embodiments the packet 225 corresponds to the physical layer 235 of the receiving computer 230 during the decapsulation process, where the 0's and 1's are decoded back into meaningful data.

Although a specific embodiment is described above with respect to FIG. 2, any of a variety of systems and/or processes may be utilized in accordance with embodiments of the disclosure. For example, various headers may be appended or included with respect to the payload data and at different layers through the encapsulation and de-encapsulation process. The aspects described in FIG. 2 may also be interchangeable with other elements of FIGS. 1 and 3-9 as required to realize a particularly desired embodiment.

Figure 3:
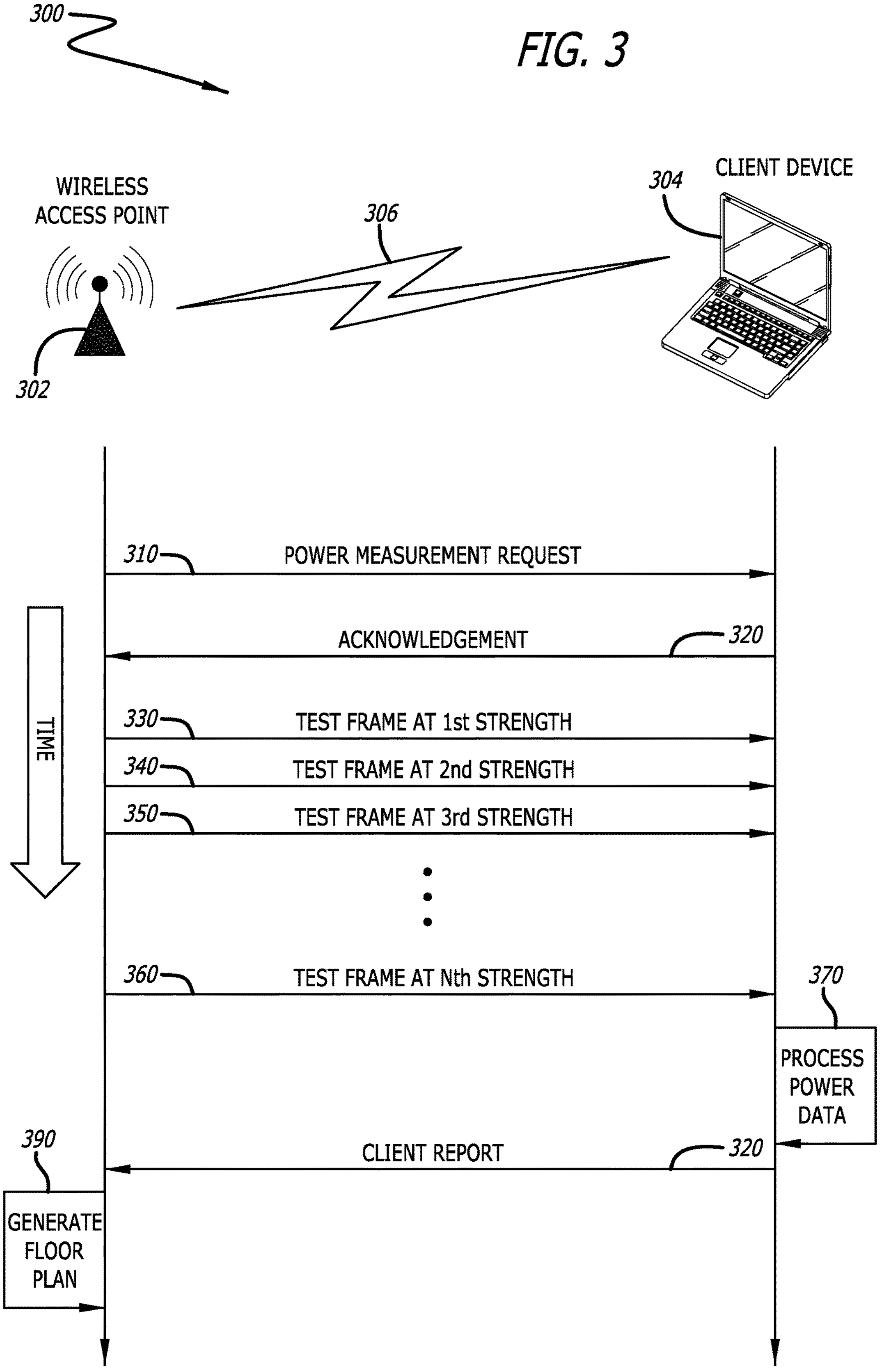
FIG. 3 is a conceptual timing diagram of a network device and a client device generating a floorplan via a plurality of test frame transmissions in accordance with various embodiments of the disclosure.

Referring to FIG. 3, a conceptual timing diagram of a network device and a client device generating a floorplan via a plurality of test frame transmissions in accordance with various embodiments of the disclosure is shown. More specifically, a wireless AP 302 communicates with a client device 304 over a wireless medium 306. Wireless communication between the AP 302 and a client device 304 may occur through many different technologies. For example, Wi-Fi is commonly used for home and office networks, while Bluetooth may be used to couple devices such as headphones and smart gadgets. Zigbee and Z-Wave are used for smart home automation. Similarly, LTE enables high-speed mobile internet on smartphones and tablets, while 5G offers even faster data rates and supports various applications. It should be appreciated that each wireless technology has its own strengths and is used based on specific needs and requirements.

In many embodiments, the timing diagram 300 begins with the AP 302 initiating a power measurement request 310 and communicating it to the client device 304. In general, this request may be configured to measure power levels or RSSI (Received Signal Strength Indication) of the wireless signals between the network device and the client device. In addition to requesting a power measurement, AP 302 could be configured to make other power-related requests to gather more information regarding the wireless network's performance and optimize its operation. For instance, the AP 302 could request a "noise measurement" to assess the level of interference or background noise in the surrounding environment. It may also ask for "transmission power adjustment" from the client devices, allowing the AP 302 to dynamically control their transmit power to achieve better signal-to-noise ratios and overall network efficiency. Furthermore, the AP 302 could inquire about "channel utilization" to understand how busy or congested the wireless channels are, helping it make informed decisions to allocate resources effectively.

In many embodiments, upon receiving the power measurement request, the client device 304 sends an acknowledgement 320 back to the network device to confirm receipt of the request. Following the acknowledgement, the client device 304 begins transmitting test frames at various signal strengths (RSSI levels) to the AP 302, for example. The acknowledgment (ACK) sent by the client device 304 to the AP 302 is an important part of the communication process. In a wireless network, the ACK is used to confirm that a transmitted data frame or packet has been successfully received without any errors.

When the network device sends a power measurement request (310), it waits for the ACK from the client device to ensure that the request was received correctly. In many embodiments, the acknowledgment frame may include an ACK Frame Control field that indicates the type of frame. As shown, this may simply be an acknowledgment. Furthermore, a sequence number of the frame may be acknowledged. This helps the network device identify the specific frame that the ACK corresponds to. In some embodiments a checksum or Frame Check Sequence (FCS) may be used to ensures the integrity of the ACK frame itself.

In the context of a wireless network, the test frames are specially crafted data frames used to assess the quality and reliability of the wireless communication link between the network device and the client device. These frames may be transmitted at different signal strengths (RSSI levels) to simulate various real-world scenarios and assess the network's performance under different conditions. In general, the RSSI represents on type of metric that may be used to quantify the received signal strength in a wireless network. It is usually measured in dBm (decibels relative to 1 milliwatt).

As described herein, the test frames may be communicated or otherwise sent at different RSSI levels to simulate weak and strong signal conditions. For example, a test frame is communicated at first strength 330; a test frame is communicated at second strength 340; and a test frame is communicated at third strength 350. Those skilled in the art will appreciate that the exact number of test frames communicated at various strengths may be varied depending on the desired implementation. Indeed, test frames may be continued to be sent in many embodiments at different strength levels up to an $N^{th}$ strength 360. In many embodiments, the client device 304 can continue sending test frames multiple times at each desired strength level to ensure reliable data collection. As these test frames are communicated back to the network device, it records the power data associated with each received frame. It is envisioned that the test frame may comprise many different formats. For example, each test frame may include fields such as the Frame Control, Duration, Receiver Address, Transmitter Address, Sequence Number, Data, and FCS.

In many embodiments, the client device 304 starts transmitting the test frames at the specified RSSI levels sequentially after sending the ACK. Each test frame may contain data that allows the network device to measure the strength of the signal at that particular RSSI level. To ensure accuracy and reliability, each test frame is often transmitted multiple times at the same RSSI level. This helps to account for potential signal variations and noise in the environment. In many embodiments, the AP 302 may provide feedback to the client device, indicating the desired RSSI levels for the test frames. Additionally, mechanisms like Automatic Gain Control (AGC) may be used to adjust the transmission power of the client device based on feedback from the network device. The AP 302 may be configured to record the received signal strength and other relevant data from each test frame. This data is later processed to evaluate the performance of the network at different signal strengths.

As shown at step 370, the client device 304 processes the accumulated power data. This data may include signal strength measurements, error rates, or other relevant parameters, without limitation. The client device 304 then communicates this processed power data back to the AP 302 in the form of a client report 320. This client report 320 may include details such as the average signal strength at different locations, areas with poor coverage, and potential sources of interference. It is envisioned that using the results of the client report 320, the AP 302 can now generate a floor plan 390. The floor plan may be based on the power data collected during the test frame transmissions, which provide insights into the signal strengths and potential areas of signal interference or weakness in the network coverage. With the floor plan generated, the network administrators or users can better understand the coverage patterns and potential dead zones within the network. This information is valuable for optimizing the placement of network devices, such as routers or access points, and improving overall network performance and user experience.

Although a specific embodiment for a conceptual timing diagram of a network device and a client device generating a floorplan via a plurality of test frame transmissions suitable for carrying out the various steps, processes, methods, and operations described herein is discussed with respect to FIG. 3, any of a variety of systems and/or processes may be utilized in accordance with embodiments of the disclosure. For example, the network capacity prediction logic may be implemented across a variety of the systems described herein such that the test frames are sent or received by devices other than the AP, and processed either locally or on the cloud, for example. The elements depicted in FIG. 3 may also be interchangeable with other elements of FIGS. 1-2 and 4-9 as required to realize a particularly desired embodiment.

Figure 4:
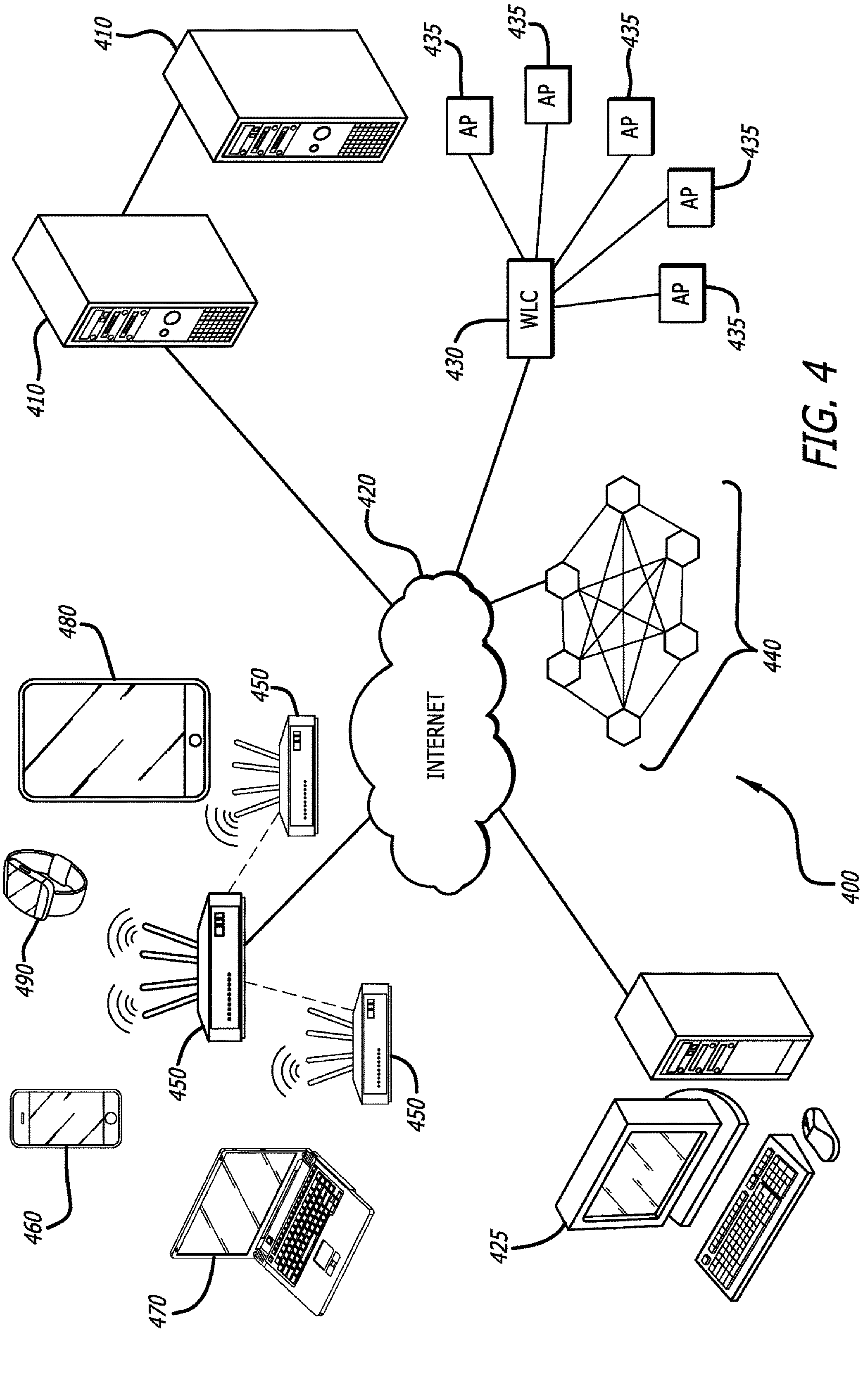
FIG. 4 is a conceptual network diagram of a various environments that a floorplan mapping logic may operate on a plurality of network devices in accordance with various embodiments of the disclosure.

Referring to FIG. 4, a conceptual network diagram of a various environments that a floorplan mapping logic may operate on a plurality of network devices in accordance with various embodiments of the disclosure is shown. Those skilled in the art will recognize that a network capacity prediction logic can be comprised of various hardware and/or software deployments and can be configured in a variety of ways. In some non-limiting examples, the network capacity prediction logic can be configured as a standalone device, exist as a logic within another network device, be distributed among various network devices operating in tandem, or remotely operated as part of a cloud-based network management tool.

In many embodiments, the network 400 may comprise a plurality of devices that are configured to transmit and receive data for a plurality of clients. In various embodiments, cloud-based network management servers 410 are connected to a wide-area network such as, for example, the Internet 420. In further embodiments, cloud-based network management servers 410 can be configured with or otherwise operate a network capacity prediction logic. The network capacity prediction logic can be provided as a cloud-based service that can service remote networks, such as, but not limited to the deployed network 440. In these embodiments, the network capacity prediction logic can be a logic that receives data from the deployed network 440 and generates predictions, confidence levels, and perhaps automates certain decisions associated with the network devices. In certain embodiments, the network capacity prediction logic can generate historical and/or algorithmic data in various embodiments and transmit that back to one or more network devices within the deployed network 440.

However, in additional embodiments, the floorplan mapping logic may be operated as distributed logic across multiple network devices. In the embodiment depicted in FIG. 4, a plurality of network access points (APs) 450 can operate as a floorplan mapping logic in a distributed manner or may have one specific device facilitate the generation of predictions and confidence levels for the various APs. This can be done to provide sufficient needs to the network of APs such that, for example, a minimum bandwidth capacity may be available to various devices. These devices may include but are not limited to mobile computing devices including laptop computers 470, cellular phones 460, portable tablet computers 480 and wearable computing devices 490.

In still further embodiments, the network capacity prediction logic may be integrated within another network device. In the embodiment depicted in FIG. 4, the wireless LAN controller 430 may have an integrated floorplan mapping logic that it can use to generate predictions, confidence levels, and perhaps automated decisions regarding the various APs 435 that it is connected to, either wired or wirelessly. In this way, the APs 435 can be configured with a network configuration based on the configurations generated by and sent from the WLC 430. In still more embodiments, a personal computer 425 may be utilized to access and/or manage various aspects of the network capacity prediction logic, either remotely or within the network itself. In the embodiment depicted in FIG. 4, the personal computer 425 communicates over the Internet 420 and can access the network capacity prediction logic within the network management servers 410, the network APs 450, or the WLC 430 to modify or otherwise monitor the floorplan mapping logic.

Although a specific embodiment for a conceptual network diagram of a various environments that a floorplan mapping logic may operate on a plurality of network devices suitable for carrying out the various steps, processes, methods, and operations described herein is discussed with respect to FIG. 4, any of a variety of systems and/or processes may be utilized in accordance with embodiments of the disclosure. For example, the various device configurations are provided as an illustrated example to convey the concepts described herein and may not be implemented exactly as described. The elements depicted in FIG. 4 may also be interchangeable with other elements of FIGS. 1-3 and 5-9 as required to realize a particularly desired embodiment.

Figure 5:
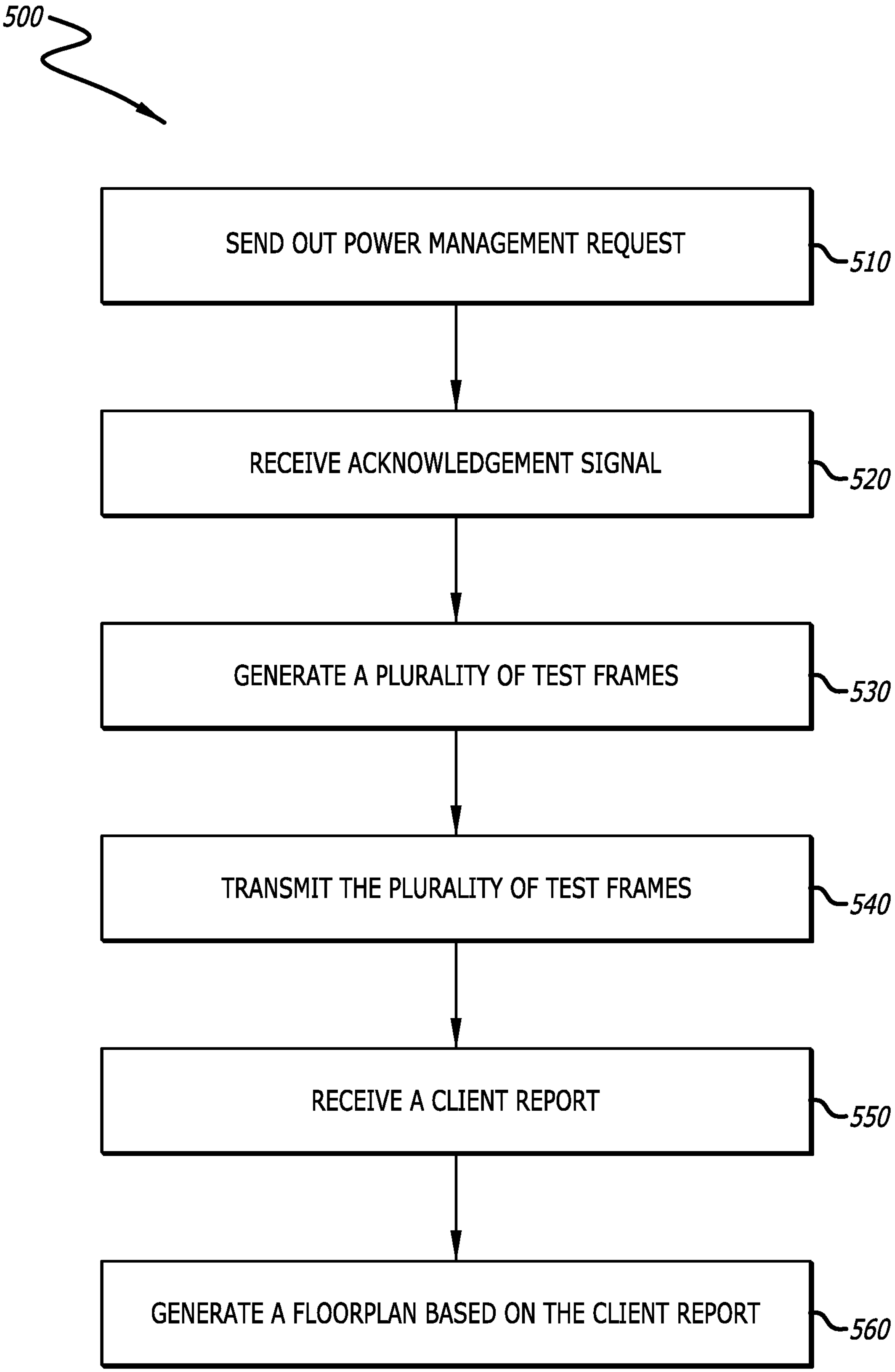
FIG. 5 is a flowchart depicting a process for generating a floor plan in accordance with various embodiments of the disclosure.

Referring to FIG. 5, a flowchart depicting a process 500 for generating a floor plan in accordance with various embodiments of the disclosure is shown. In many embodiments, the process 500 can begin by communicating or otherwise transmitting a power management request to the client devices within its range (block 510). In general, this request aims to measure and optimize the power consumption and performance of these devices. In certain embodiments, the power management request is directed at a specific plurality of devices. However, additional embodiments may transmit the power management request over the network such that one or more network devices can hear the request and respond. Often, in response to the client devices receiving the power management request, they send an acknowledgement signal back to the network device. The process can then receive that acknowledgement signal configured to confirm receipt of the request (block 520).

In numerous embodiments, the network device can generate a plurality of test frames (block 530). In many embodiments, the test frames may include data packets designed to simulate various wireless communication scenarios and evaluate the network's performance under different conditions as described herein. In some embodiments, the plurality of test frames can be configured with data payloads that are empty or only have padding such that the test frames can be processed in a uniform or easier manner by the receiving device.

In more embodiments, the network device can begin transmitting the plurality of test frames to the client devices (block 540). As discussed above, the plurality of test frames can be configured at unique/different transmission power levels. In still additional embodiments, the test frames can be transmitted directly to the network devices or may be broadcast such that multiple network devices can receive the frames.

In additional embodiments, the process can receive a client report (block 550). Often, one or more of the client devices may be configured to compile data and generate a comprehensive client report. This report may include vital information such as power transmission level signal strengths, error rates or comparison values between the actual power transmission levels and the received or measured signal levels, as well as other performance metrics observed during the test frame transmissions. The client report may also be configured to provide valuable insights into the network's overall health and identifies areas that may require optimization.

In still further embodiments, the process can utilize the data from the client report, to generate a floorplan (block 560). In many embodiments, the floorplan may be based on the collected information and visualizes the network's coverage, signal distribution, and potential areas of improvement. This visualization can be formatted by use by a user but may also be formatted such that it can be utilized by devices within the network without generating a direct visualization.

Although a specific embodiment for a flowchart depicting a process for generating a floor plan suitable for carrying out the various steps, processes, methods, and operations described herein is discussed with respect to FIG. 5, any of a variety of systems and/or processes may be utilized in accordance with embodiments of the disclosure. For example, the process may be performed by an AP, switch, router, or other network device. The elements depicted in FIG. 5 may also be interchangeable with other elements of FIGS. 1-4 and 6-9 as required to realize a particularly desired embodiment.

Figure 6:
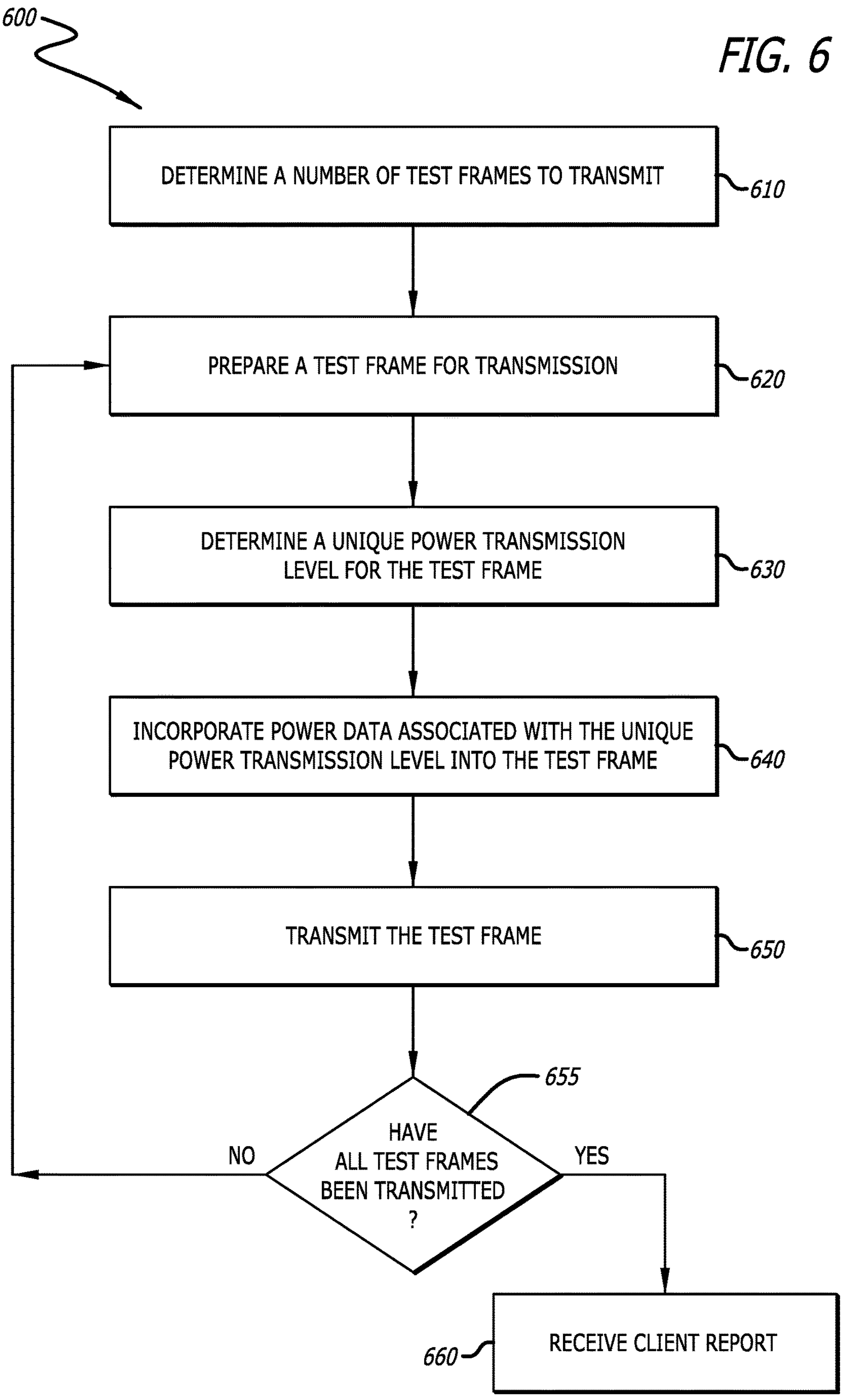
FIG. 6 is a flowchart depicting a process for transmitting a plurality of test frames in accordance with various embodiments of the disclosure.

Referring to FIG. 6, a flowchart depicting a process 600 for transmitting a plurality of test frames in accordance with various embodiments of the disclosure is shown. In many embodiments, the process 600 can begin by determining the number of test frames to transmit, which establishes the scope of the testing process (block 610). Subsequently, the process 600 can prepare a test frame for transmission (block 620). In a number of embodiments, the test frame can be configured to encompass the necessary data and settings required for evaluation. In numerous embodiments, a unique power transmission level for the test frame is determined (block 630). This configuration allows the network device to vary the strength of the transmitted signal during the testing phase; or repeat a particularly desirable RSSI, without limitation. In some embodiments, a first test frame is sent out at a first transmission level while subsequent test frames are transmitted at progressively lower transmission levels.

In many embodiments, the determined power data associated with the unique power transmission level is then incorporated into the test frame (block 640). In some embodiments, the power data can be a direct listing of the transmission level that is used to transmit the test frame. In this way, the receiving network device can understand or otherwise determine the power used to transmit the received signal at the originating device. This can later be compared to the actual measurement of signal strength of the received test frame signal.

In further embodiments, the test frame is transmitted to the designated client device (block 650). The test frame can be transmitted directly to the client device or may be broadcast out such that the designated client device can acquire the test frame. As those skilled in the art will recognize, the transmission can be wired or wirelessly throughout a deployment environment which may be navigated through one or more environmental barriers or floors.

In additional embodiments, the process 600 can evaluate whether all test frames have been transmitted (block 655). If it is determined that all test frames have been sent, the process can move to the next stage, and a client report is subsequently received (block 660). This report may include critical data, such as signal strength measurements and performance metrics, which will be crucial for further analysis and floorplan generation. However, if not all test frames have been transmitted, the process 600 can again prepare the next test frame, continuing until all test frames have been sent and the complete set of data is available for generating the client report and subsequent floorplan (block 620).

Although a specific embodiment for flowchart depicting a process for transmitting a plurality of test frames is discussed with respect to FIG. 6, any of a variety of systems and/or processes may be utilized in accordance with embodiments of the disclosure. For example, the power transmission levels may be predetermined or based on one or more metrics for a particular network configuration. The elements depicted in FIG. 6 may also be interchangeable with other elements of FIGS. 1-5 and 7-9 as required to realize a particularly desired embodiment.

Figure 7:
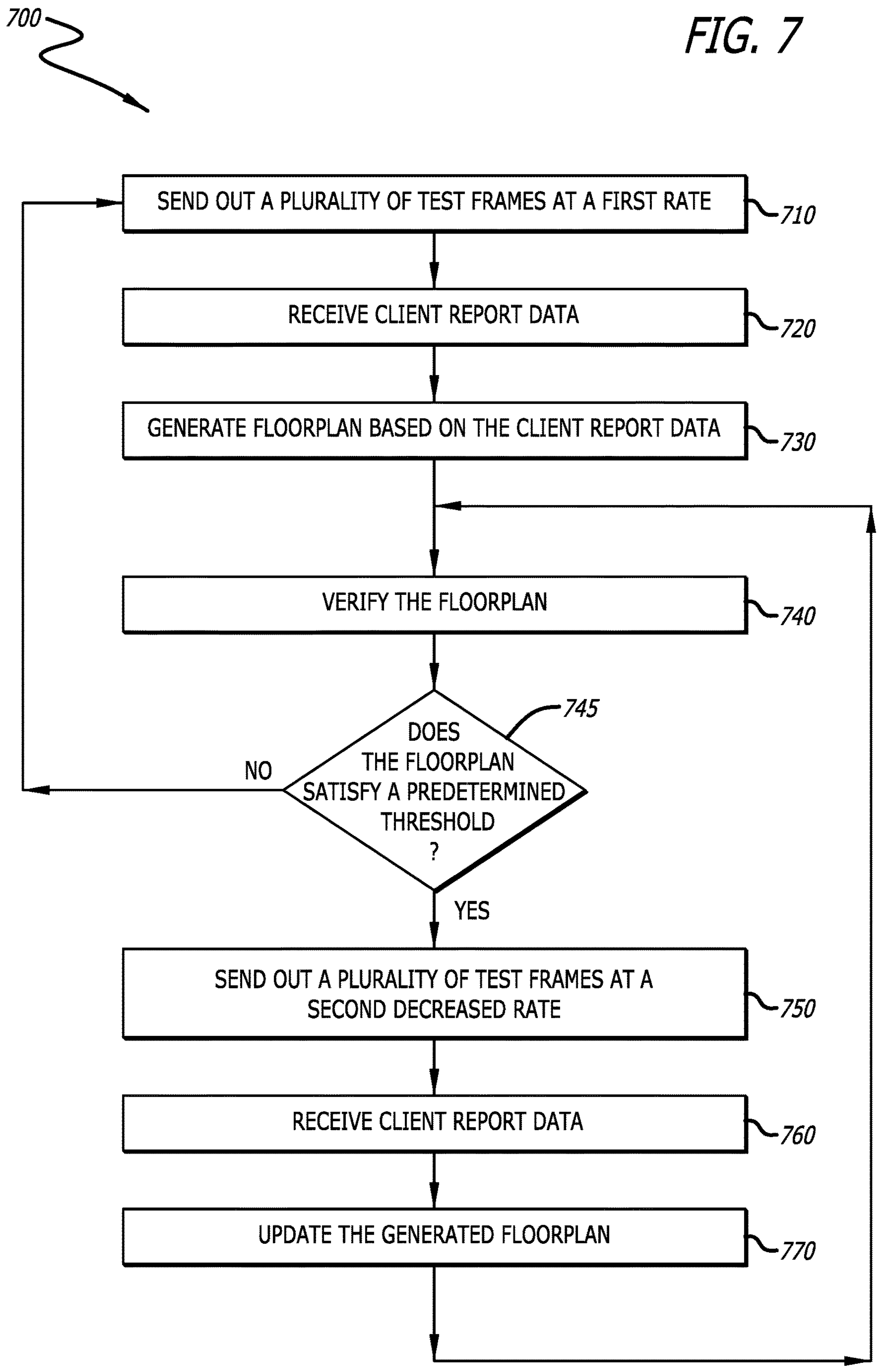
FIG. 7 is a flowchart depicting a process for verifying and updating a generated floorplan in accordance with various embodiments of the disclosure.

Referring to FIG. 7, a flowchart depicting a process 700 for verifying and updating a generated floorplan in accordance with various embodiments of the disclosure is shown. The process 700 can send out a plurality of test frames at a first rate, allowing the network device to gather essential data regarding the wireless environment (block 710). Subsequently, the received client report data provides valuable insights into signal strengths and network performance (block 720). Thereafter, in many embodiments, a preliminary floorplan is generated based on the client report data (block 730).

In a number of embodiments, the floorplan may be verified (block 740). In some embodiments, the verification can be done to ensure accuracy of the floorplan. As those skilled in the art can recognize, the verification can include comparing the actual results of data transmission against the predicted results based on the floorplan. This comparison can be between predicated and actual data, or via one or more scores or metrics that are utilized within or by the floorplan.

In many embodiments, a determination is made to evaluate if the floorplan satisfies a predetermined threshold (block 745). It is envisioned that several options can determine how a floorplan could satisfy a predetermined threshold. One approach may include achieving a specific minimum signal strength level across all areas of the floorplan, ensuring adequate coverage and minimal dead zones. Another option includes optimizing the signal-to-noise ratio (SNR) by reducing interference and noise levels within the space. In some embodiments, the floorplan can also satisfy the threshold by minimizing signal attenuation and propagation issues, such as reflections and diffractions, to improve overall signal quality. Additionally, meeting the threshold may involve balancing the number and placement of APs to provide seamless roaming and load balancing among devices. Finally, the floorplan can be designed to comply with specific performance metrics, such as data throughput, latency, and packet loss, to meet the desired network performance goals.

If the floorplan does not meet the required criteria, the process can initiate another round of test frames at the first rate (block 720). However, if the floorplan meets the threshold, the process advances to the next phase, wherein a plurality of test frames is sent out at a second, decreased rate (block 750). In this way, fewer test frames are needed to retain the necessary amount of floorplan accuracy.

In more embodiments, the process can receive client report data (block 760). In some embodiments, with the updated client report data generated from the fewer test frames, the floorplan is updated or otherwise revised to reflect the most recent findings accurately (block 770). In still additional embodiments, the process 700 may again verify the floorplan (block 740). In this way, the process 700 can ensure that the changes made align with the predetermined threshold. In some embodiments, the process 700 may continue until the floorplan satisfactorily meets the required criteria and the wireless network is optimally configured.

Although a specific embodiment for a flowchart depicting a process for verifying and updating a generated floorplan is discussed with respect to FIG. 7, any of a variety of systems and/or processes may be utilized in accordance with embodiments of the disclosure. For example, the process may be used with predetermined thresholds and/or updated using one or more machine learning models as described herein. The elements depicted in FIG. 7 may also be interchangeable with other elements of FIGS. 1-6 and 8-9 as required to realize a particularly desired embodiment.

Figure 8:
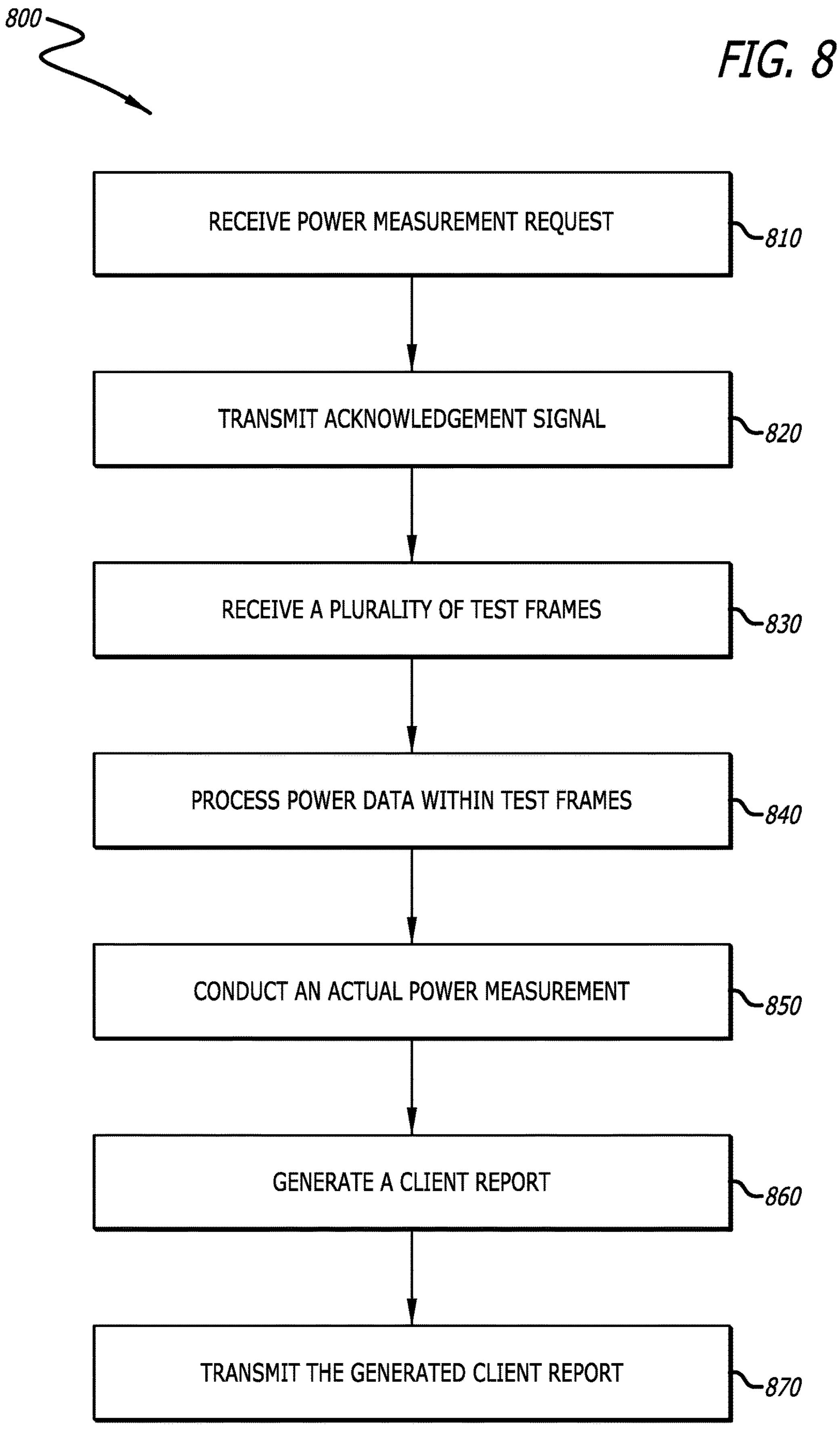
FIG. 8 is a flowchart depicting a process for generating client reports based on received test frames in accordance with various embodiments of the disclosure.

Referring to FIG. 8, a flowchart depicting a process 800 for generating client reports based on received test frames in accordance with various embodiments of the disclosure is shown. The process 800 begins by receiving a power measurement request from the network device (block 810). In some embodiments, upon receipt, the process 800 may send back an acknowledgement signal to confirm that the request has been received (block 820).

Subsequently, the process 800 may receive a plurality of test frames that can be configured to be transmitted from another network device, such as, but not limited to, an AP a client device, for example (block 830). As described herein, these test frames can be configured to contain or otherwise incorporate power data. In various embodiments, the process 800 can process the power data (block 840). In some embodiments, processing power data within test frames may include analyzing and interpreting the signal strength information contained in the received frames to derive meaningful insights about the wireless network's performance. Similarly, in some embodiments, the client device extracts the power data from each test frame, which usually includes the RSSI.

In more embodiments, RSSI or other measurement values may be converted to dBm (decibels milliwatt) for more accurate measurement, for example. Similarly, it is envisioned that signal strength measurements may be aggregated from multiple test frames to obtain a more comprehensive view of the signal distribution across the coverage area. Aggregating the data helps reduce the impact of fluctuations and noise, providing a more reliable representation of the network's performance. To further enhance accuracy, the filtering and smoothing techniques may be applied to the signal strength data. Those skilled in the art will appreciate that these may be used to remove outliers and reduce variations, making the data more consistent and reliable. Interpolation and Extrapolation: In cases where test frames are not evenly spaced or cover the entire area, the client device may use interpolation and extrapolation methods to estimate signal strengths at specific locations. This helps create a more complete picture of signal coverage across the entire floorplan.

In some embodiments, the process can conduct an actual power measurement (block 850). In further embodiments, the client device may assess the received signal strength indicated in the actual power measurement and compare that to the power data within the received test frames. With the power measurement and comparison completed, the process 800 may be configured to generate a comprehensive client report (block 860). It is contemplated that summarizing the observed signal strengths and performance indicators can often be formatted and incorporated within the client report. This client report is then transmitted back to the network device to provide valuable insights for further analysis and potential network optimization (block 870).

Although a specific embodiment for a flowchart depicting a process for generating client reports based on received test frames is discussed with respect to FIG. 8, any of a variety of systems and/or processes may be utilized in accordance with embodiments of the disclosure. For example, power measurement requests may be communicated serially or in parallel and the number of test frames and power levels may be varied without limitation. The elements depicted in FIG. 8 may also be interchangeable with other elements of FIGS. 1-7 and 9 as required to realize a particularly desired embodiment.

Figure 9:
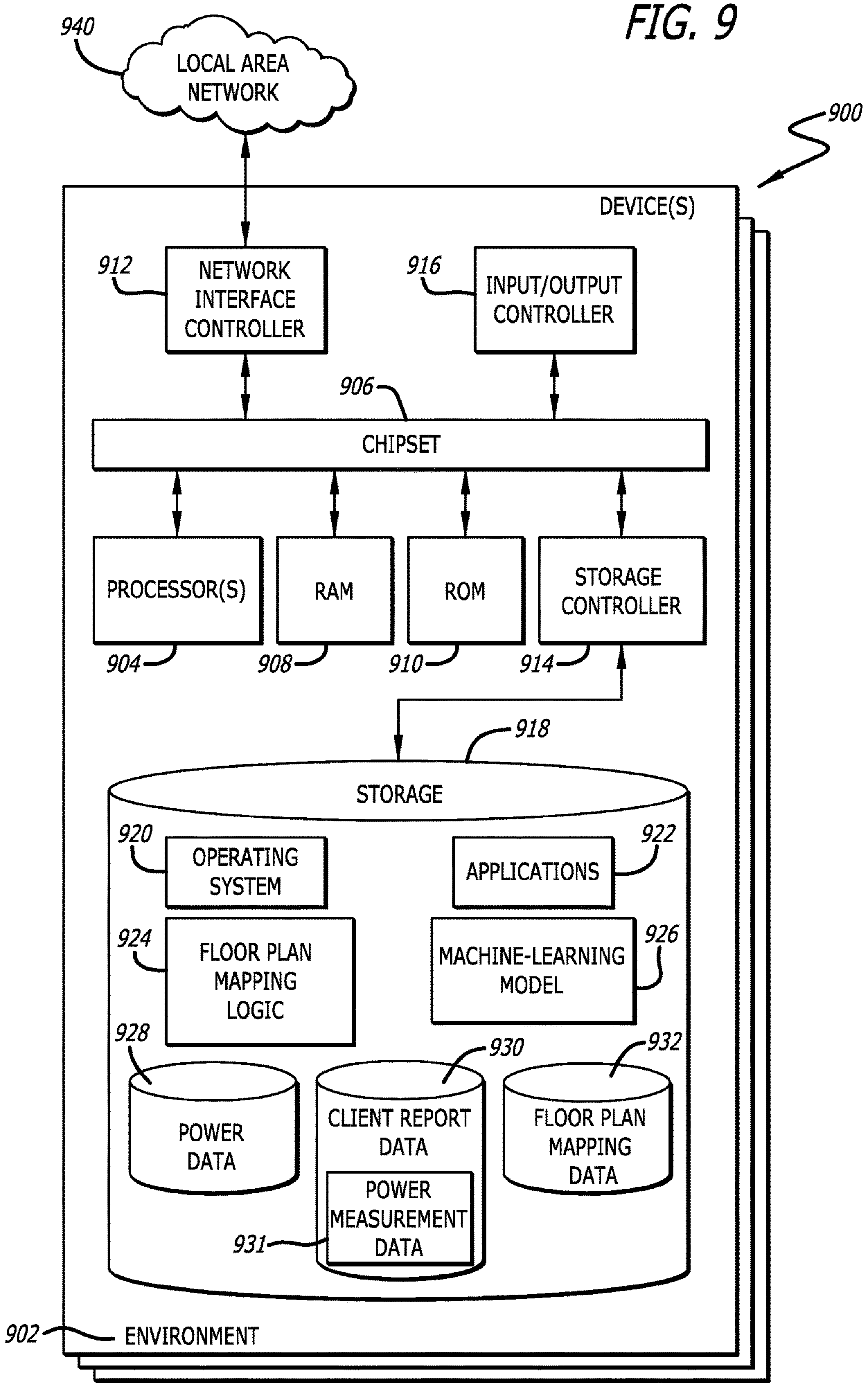
FIG. 9 is a conceptual block diagram of a device suitable for generating floorplans based on a plurality of tests frames in accordance with various embodiments of the disclosure.

Referring to FIG. 9, a conceptual block diagram of a device suitable for generating floorplans based on a plurality of tests frames in accordance with various embodiments of the disclosure is shown.

The embodiment of the conceptual block diagram depicted in FIG. 9 can illustrate a conventional server computer, workstation, desktop computer, laptop, tablet, network device, router, switch, e-reader, smart phone, or other computing device, and can be utilized to execute any of the application and/or logic components presented herein. The device 900 may, in some examples, correspond to physical devices and/or to virtual resources and embodiments described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to communicatively couple a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications 922, and data 928, 930, 932, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include a floorplan mapping logic 924 that can be configured to perform one or more of the various steps, processes, operations, and/or other methods that are described above. While the embodiment shown in FIG. 9 depicts a logic focused on floorplan mappings, it is contemplated that a more general "network needs" logic may be utilized as well or in lieu of such logic. Often, the floorplan mapping logic 924 can be a set of instructions stored within a non-volatile memory that, when executed by the controller(s)/processor(s) 904 can carry out these steps, etc. In some embodiments, the network capacity prediction logic 924 may be a client application that resides on a network-connected device, such as, but not limited to, a server, switch, personal or mobile computing device in a single or distributed arrangement. In certain embodiments, the network capacity prediction logic 924 can be a dedicated hardware device or be configured into a system on a chip package (FPGA, ASIC and the like).

In a number of embodiments, the storage 918 can include power data 928. As discussed above, the floor plan mapping data 932 can be collected in a variety of ways and may involve data related to multiple levels of the mapping data. The floor plan mapping data 932 may be associated with an entire network or a portion/partition of a network. This may also include a relationship of the various associated APs that are associated with each other AP or network device such that relationships of how to transfer or "pre-move" clients back and forth can be determined based on the floor plan mapping data 932 as currently understood. In additional embodiments, the floor plan mapping data 932 can include not only the network devices and network traffic data associated within but may also include details about the hardware configuration and/or capabilities of the network devices within the floorplan. This can allow for more specific configurations based on various lower-power mode settings, or transceiver capabilities.

In various embodiments, the storage 918 can include client report data 930. As described above, client report data 930 can be configured to include various items such as past need levels, client connection histories, as well as previously determined paths for those client connections. In some embodiments, each non-stationary client may be determined to follow one or more of a limited number of determined paths within the floorplan, which can indicate seasonality but also provide insight into predictions on where the client may need to be handed off to another AP or even pre-moved. For example, a mobile computing device like a smart phone can be held by a person walking through a typical path on a floorplan to go from one area to another. The limited number of paths within an office floorplan may indicate where that client may be moving toward. In some embodiments, external data, such as calendaring data can be accessed or stored in historical data to inform of patterns or paths that the client may take. In additional embodiments, client report data 930 can be related to clients such that future predictions, such as with the ML, models 926 can be utilized to better handle pre-moving clients when a known path is determined. Power measurement data 931 may be represented as an RSSI value is usually expressed in dBm (decibels milliwatt) and provides an estimate of the signal's intensity, for example. Additionally, power measurement data may include other relevant metrics such as signal quality, noise levels, and signal-to-noise ratio (SNR). These measurements help assess the performance and reliability of the wireless connection, identify potential signal interferences or weaknesses, and guide decisions for optimizing the network's coverage and transmission power levels.

In still more embodiments, the storage 918 can include floor plan mapping data 932. For example, floor plan mapping data 932 may include information regarding the layout and characteristics of a physical space within a building. This data may consist of the location and dimensions of rooms, walls, doors, and windows, providing a detailed representation of the indoor environment. Additionally, floorplan mapping data can incorporate the placement and coverage areas of wireless access points, routers, and other network devices. Signal strength measurements, signal propagation models, and coverage contours may also be part of the data, enabling a visualization of the wireless network's coverage and performance across the floorplan. This valuable information assists in identifying areas with strong or weak wireless connectivity, potential sources of interference, and aids network administrators in optimizing the network layout for improved user experience and efficient wireless communication.

As discussed above, a floorplan being managed by a hardware-based network device may have a fixed amount of computational resources available and/or only have access to a limited number of methods to generate predictions and confidence levels. However, a cloud-based network suite may have access to a large number of computations resources and methods to generate predictions and confidence levels. Floor plan mapping data 932 can be configured to capture these available resources and options. In still further embodiments, the floor plan mapping data 932 can be configured to capture what the latency needs, and selected options are for each network device within the floorplan.

Finally, in many embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to learn the pattern of the client traffic flow of various network devices and generate predictions and/or confidence levels regarding future network needs. In some embodiments, the ML model 926 can be configured to determine which method of generating those predictions would work best based on certain conditions or with certain network devices.

The ML model(s) 926 can be configured to generate inferences to make predictions or draw conclusions from data. An inference can be considered the output of a process of applying a model to new data. This can occur by learning from at least the topology data, historical data, and/or the algorithmic data and use that learning to predict future outcomes and needs. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc.

Although a specific embodiment for a device suitable for a conceptual block diagram of a device suitable for generating floorplans based on a plurality of tests frames is discussed with respect to FIG. 9, any of a variety of systems and/or processes may be utilized in accordance with embodiments of the disclosure. For example, the device may be in a virtual environment such as a cloud-based network administration suite, or it may be distributed across a variety of network devices or APs such that each acts as a device and the floorplan mapping logic 924 acts in tandem between the devices. The elements depicted in FIG. 9 may also be interchangeable with other elements of FIGS. 1-8 as required to realize a particularly desired embodiment.

Information Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
at least one network interface controller configured to provide access to a network; and
a memory communicatively coupled to the processor, wherein the memory comprises a floor plan mapping logic that is configured to:
generate a plurality of test frames for transmission to network devices on the network;
wherein an initial frame in the plurality of test frames comprises a current access point ("AP") power level and a frame index that signifies a position of the initial frame within the plurality of test frames;
transmit the generated plurality of test frames at a respective plurality of unique power levels;
receive client report data from at least one network device on the network wherein the client report data comprises a plurality of power data and power measurement data; and
generate a floor plan mapping comprising signal coverage perimeters for a plurality of APs based on the received client report data.

2. The device of claim 1, wherein the floor plan mapping is generated via one or more machine learning models.

3. The device of claim 2, wherein the one or more machine learning models utilize the client report data as input data and generates floor plan mapping data as an output.

4. The device of claim 1, wherein the floor plan mapping logic is configured to first transmit a power measurement request to network devices on the network, prior to the generation of the plurality of test frames.

5. The device of claim 1, wherein the plurality of test frames is transmitted at unique transmission power levels.

6. The device of claim 5, wherein each of the plurality of test frames has power data associated with the unique transmission power level.

7. The device of claim 6, wherein the power data is incorporated within a header of the test frame.

8. The device of claim 7, wherein a power measurement request is incorporated within the test frame.

9. The device of claim 8, wherein a payload of the test frame is configured to be empty.

10. The device of claim 8, wherein a payload of the test frame is configured with padding data.

11. A method of generating a floor plan mapping, comprising:
generating a first plurality of test frames for transmission to network devices on a network;
wherein an initial frame in the plurality of test frames comprises a current access point ("AP") power level and a frame index to signify a position of the initial frame within the plurality of test frames;
transmitting the generated first plurality of test frames at a plurality of unique power levels;
receiving client report data from at least one network device on the network wherein the client report data comprises a plurality of power data and power measurement data; and
generating a floorplan mapping comprising signal coverage perimeters for a respective plurality of APs based on the received client report data.

12. The method of claim 11, wherein the method further comprises generating a floor plan based on at least the received client report.

13. The method of claim 12, wherein the method further includes verifying the floorplan.

14. The method of claim 13, wherein, upon verification of the floorplan, a second plurality of test frames are transmitted to the plurality of devices, wherein the second plurality of test frames comprises fewer test frames than the first plurality of test frames.

* * * * *